May 24, 1938.   E. J. GERMAN   2,118,189
NEST DOOR
Filed Jan. 19, 1937
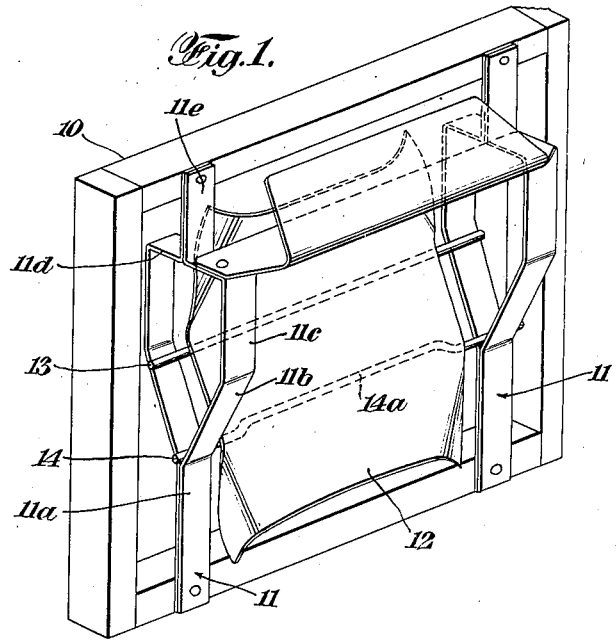
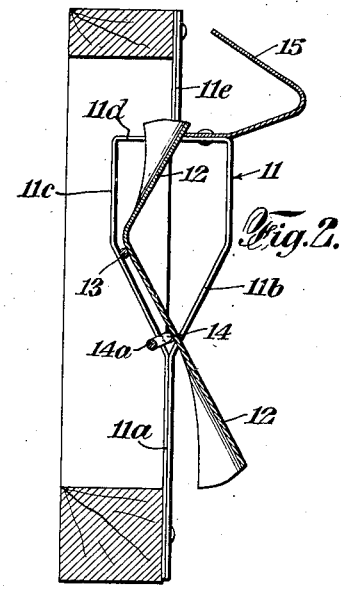
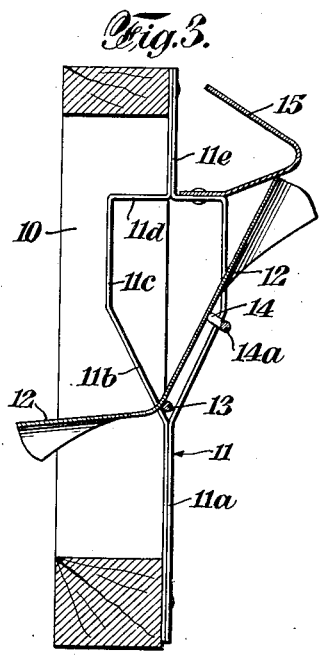
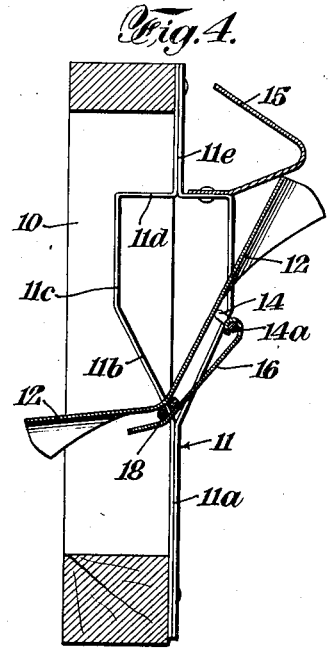
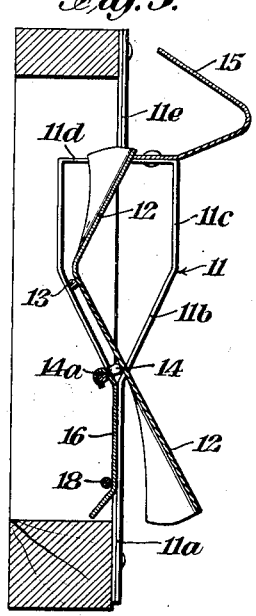
INVENTOR
Elmer J. German
BY
Kenyon & Kenyon
ATTORNEYS.

Patented May 24, 1938

2,118,189

UNITED STATES PATENT OFFICE 2,118,189

NEST DOOR

Elmer J. German, Interlaken, N. Y.

Application January 19, 1937, Serial No. 121,257

12 Claims. (Cl. 119—49)

This invention relates to nest doors.

An object of this invention is a nest door which is inexpensive to manufacture, can be easily and cheaply attached to practically all existing nest equipment and is efficient to permit ingress and egress of a hen while creating privacy for her and freedom from molestation by other hens.

An additional object is a modified arrangement by means of which a hen may be locked in the nest and can be freed only by the attendant.

Other objects, novel features and advantages of this invention will become apparent from the following specification and accompanying drawing, wherein:

Fig. 1 is a perspective view of a nest door embodying the invention in closed position;

Fig. 2 is a vertical section through the door in closed position;

Fig. 3 is a similar section but with the door in open position;

Fig. 4 is a vertical section of a modified form of door in open position, and

Fig. 5 is a similar view in closed position.

In the drawing, the doorway 10 may be a frame for attachment to a nest box but preferably is an integral part of the nest box, it being illustrated as a separate frame solely for the purpose of simplifying the drawing. A pair of frames 11 extend vertically across the doorway 10 and are arranged adjacent the sides thereof. Each frame is formed of a pair of metal straps having in succession contacting vertical sections 11a, diverging sections 11b, vertical sections 11c, horizontal sections 11d and finally, vertical contacting sections 11e. The diverging sections 11b combine to form a V-shaped support for the door subsequently to be described. The door 12 consists of a plate supported by two horizontal rods 13 and 14 arranged respectively inwardly and outwardly of the horizontal median of the plate. Both of these rods extend at both ends beyond the lateral edges of the plate 12 and extend into the V-shaped portions of the frames 11. These rods are suitably attached to the plate 12 and the rod 14 is offset centrally as at 14a for a purpose later to be described. A shield 15 is supported by the horizontal sections 11d of the frames 11.

In the closed position of the door, the ends of the rods 14 lie in the points of the V-shape sections while the ends of the rods 13 rest against the inward sections 11b of the frames 11, such position being shown in Fig. 2. With this arrangement, the entrance to the nest is closed and a hen in the nest is protected against molestation. There is, however, slight clearance between the bottom of the plate 12 and the bottom of the doorway. When a hen is ready to leave the nest, it seeks to thrust its head beneath the bottom edge of the plate 12 and in so doing lifts the plate in such a manner that the ends of the rod 14 slide up the outward oblique sections 11b while the ends of the rod 13 slide down the inward sections 11b, thereby bringing the plate 12 into substantially horizontal position. The hen may then move out of the nest with the plate 12 riding on her back and being lifted to whatever elevation is necessary to permit the hen to pass through. As the hen leaves the nest, she turns the plate sufficiently that the ends of the rod 13 ride down the inward sections 11b as shown in Fig. 3, while the ends of the rods 14 ride up the outward sections 11b into the position shown in Fig. 3 with clearance between the bottom of the plate 12 and the bottom of the doorway. When a hen enters the nest it seeks to thrust its head beneath the bottom edge of the plate 12 and reverses the procedure just described to bring the plate 12 back into the position shown in Fig. 2 with the hen out of the nest.

In the position shown in Fig. 2, the inner edge of the plate 12 engages the rear edge of the shield 15 thereby limiting swinging movement of the plate with the rod 14 as a pivot. In the position shown in Fig. 3, the outer edge of the plate 12 engages the front part of the shield 15 thereby limiting pivotal movement of the plate 12 about the rod 13 as a pivot. In each of these two positions, the plate is stably supported and will remain in such position until operation of the plate by a hen as previously described.

In the arrangement shown in Figs. 4 and 5, locking means are provided to keep a hen within the nest. A gate 16 is hinged to the offset portion 14a of the rod 14 by means of hooks 17, this arrangement permitting easy application and removal of the gate 16. A rod 18 extends across the lower end of the gate 16 and has its ends extending in back of the frames 11. When the door 12 is arranged in the open position shown in Fig. 4, the gate 16 is held up against it by reason of the engagement of the ends of the rod 18 with the inward sections 11b of the frames 11. A hen, upon entering the nest tilts the door as previously described to bring it into its closed position as shown in Fig. 5. In such position, the gate 16 hangs down vertically with its bottom in close proximity to the bottom of the doorway, and it is prevented against outward swinging by engagement of the ends of the rod 18 with the frames 11. The hen, therefore, cannot reach the forward edge of the plate 12 to swing it into open position. As a result, the hen is locked in the nest and the door can be opened only from the outside of the nest by the operator.

Although the rods 13 and 14 have been described as extending across the plate 12, it is to be understood that each rod might be replaced by a pair of short pins having the same relation to the plate as the ends of the rods. Also it is to be understood that each frame 11 may be made of a single strip of material suitably shaped instead of being made up as specifically described. In such event, the shield 15 may be provided with a right-angle extension to take the place of the vertical sections 11e. Furthermore, it is to be understood that different means of securing the gate 16 to the plate 12 may be employed and that the means shown are merely exemplary.

I claim:

1. A nest door comprising a plate, a pair of pivots extending horizontally from opposite edges of the plate at either side of the horizontal median of said plate, and a pair of frames each having a V-shaped portion engaged by said pivots whereby said plate is supported in either of two inclined positions.

2. A nest door according to claim 1 wherein a shield extends outwardly from the top of said frames and is engageable by one edge of said plate to limit pivoted movement of said plate in one direction.

3. A nest door comprising a plate, a pair of pivots extending horizontally from opposite edges of said plate at either side of the horizontal median of said plate, a pair of frames each having a V-shaped portion engaged by said pivots whereby said plate is supported in either of two inclined positions, a gate hinged to said plate outwardly of the horizontal median and pins on said gate engageable with said frame to prevent outward movement of said gate.

4. A nest door according to claim 3 in which a shield extends outwardly from the top of said frames and is engageable by one edge of said plate to limit pivotal movement of said plate in one direction.

5. In combination, a doorway, a pair of vertical frames extending across said doorway, each of said frames having upwardly diverging sections, a plate, pins extending horizontally from opposite edges of the plate at either side of the horizontal median thereof and engaging the diverging sections of said frames for supporting said plate in either of two inclined positions.

6. In combination, a doorway, a pair of vertical frames extending across said doorway, each of said frames having upwardly diverging sections, a plate, pins extending horizontally from opposite edges of the plate at either side of the horizontal median thereof and engaging the diverging sections of said frames for supporting said plate in either of two inclined positions, and a shield extending outwardly from the upper portion of said frames and being engageable by one end of said plate to limit movement thereof in one direction.

7. In combination, a doorway, a pair of vertical frames extending across said doorway, each of said frames having upwardly diverging sections, a plate, pins extending horizontally from opposite edges of the plate at either side of the horizontal median thereof and engaging the diverging sections of said frames for supporting said plate in either of two inclined positions, and a gate hinged to said plate outwardly of the horizontal median thereof and pins on said gate engageable with said frames to prevent outward movement of said gate.

8. In combination, a doorway, a pair of vertical frames extending across said doorway, each of said frames having upwardly diverging sections, a plate, pins extending horizontally from opposite edges of the plate at either side of the horizontal median thereof and engaging the diverging sections of said frames for supporting said plate in either of two inclined positions, a shield extending outwardly from the upper portion of said frames and being engageable by one end of said plate to limit movement thereof in one direction, a gate hinged to said plate outwardly of the horizontal median thereof, and pins on said gate engageable with said frames to prevent outward movement of said gate.

9. A nest door according to claim 1 wherein a shield extends between the tops of said frames and is engageable by the inner and outer ends of said plate to limit pivotal movement of said plate in either of its two positions.

10. A nest door according to claim 3 wherein a shield extends between the tops of said frames and is engageable by the inner and outer ends of said plate to limit pivotal movement of said plate in either of its two positions.

11. In combination, a doorway, a pair of vertical frames extending across said doorway, each of said frames having upwardly diverging sections, a plate, pins extending horizontally from opposite edges of the plate at either side of the horizontal median thereof and engaging the diverging sections of said frames for supporting said plate in either of two inclined positions, and a shield extending between the upper portions of said frames, said shield being engageable by the inner and outer ends of said plate to limit pivotal movement thereof in either of its two positions.

12. In combination, a doorway, a pair of vertical frames extending across said doorway, each of said frames having upwardly diverging sections, a plate, pins extending horizontally from opposite edges of the plate at either side of the horizontal median thereof and engaging the diverging sections of said frames for supporting said plate in either of two inclined positions, a shield extending between the upper portions of said frames, said shield being engageable by the inner and outer ends of said plate to limit pivotal movement thereof in either of its two positions, a gate hinged to said plate outwardly of the horizontal median thereof, and pins in said gate engageable with said frames to prevent outward movement of said gate.

ELMER J. GERMAN.